US008471522B2

(12) United States Patent
Virk

(10) Patent No.: US 8,471,522 B2
(45) Date of Patent: Jun. 25, 2013

(54) SYSTEM FOR CHARGING ELECTRICALLY POWERED AUTOMATED GUIDED VEHICLES

(75) Inventor: Raman Virk, Hamilton (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 262 days.

(21) Appl. No.: 13/102,090

(22) Filed: May 6, 2011

(65) Prior Publication Data
US 2012/0282065 A1 Nov. 8, 2012

(51) Int. Cl.
*H02J 7/14* (2006.01)
*H02J 7/00* (2006.01)
*H02J 7/04* (2006.01)

(52) U.S. Cl.
USPC ........... 320/104; 320/109; 320/132; 320/137; 320/140; 320/152; 903/903; 903/907; 180/65.21

(58) Field of Classification Search
CPC .................................................. Y02T 10/7005
USPC ......................................................... 320/104
See application file for complete search history.

(56) References Cited

U.S. PATENT DOCUMENTS

| 4,777,416 A | 10/1988 | George, II et al. |
| 5,272,431 A | 12/1993 | Nee |
| 5,821,731 A * | 10/1998 | Kuki et al. ..................... 320/108 |
| 2003/0001541 A1 * | 1/2003 | Ueda et al. ..................... 320/134 |

* cited by examiner

*Primary Examiner* — Edward Tso
*Assistant Examiner* — Ahmed Omar
(74) *Attorney, Agent, or Firm* — Gifford, Krass, Sprinkle, Anderson & Citkowski, P.C.

(57) ABSTRACT

A system for periodically charging an electrically powered automated guided vehicle includes a charging station positioned adjacent a predetermined route of the automated guided vehicle. The charging station includes a charging arm which is selectively movable between a stowed position and a charge position in which the charging arm engages with the automated guided vehicle to perform a charging operation. The charging station is dimensioned and positioned so as to be positioned underneath a bottom surface of a platform connected to the automated guided vehicle and between a side edge of the platform and the automated guided vehicle.

14 Claims, 3 Drawing Sheets

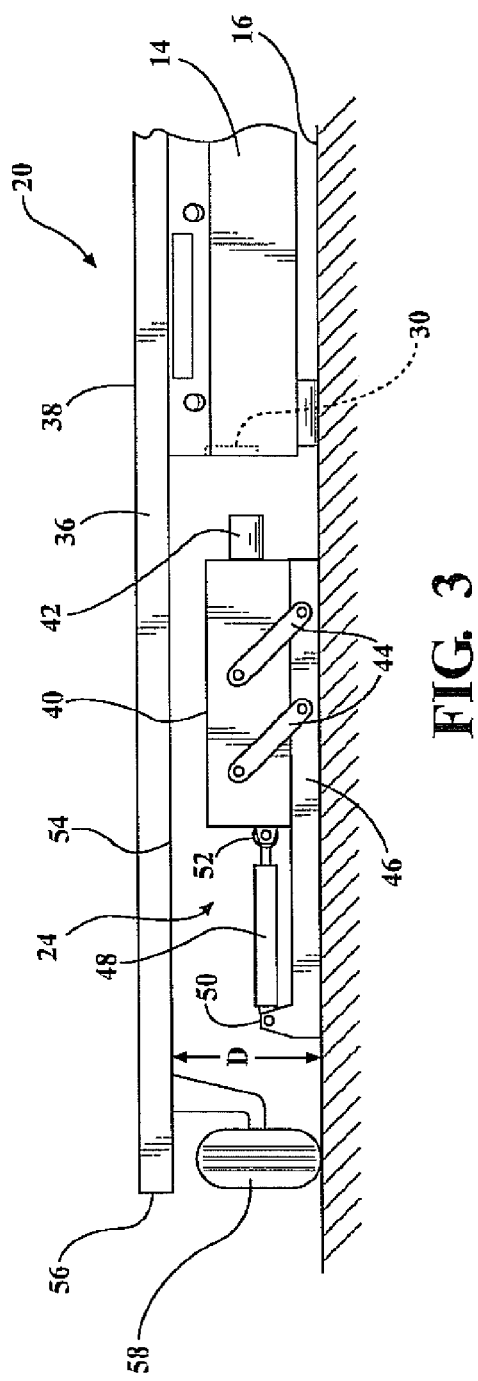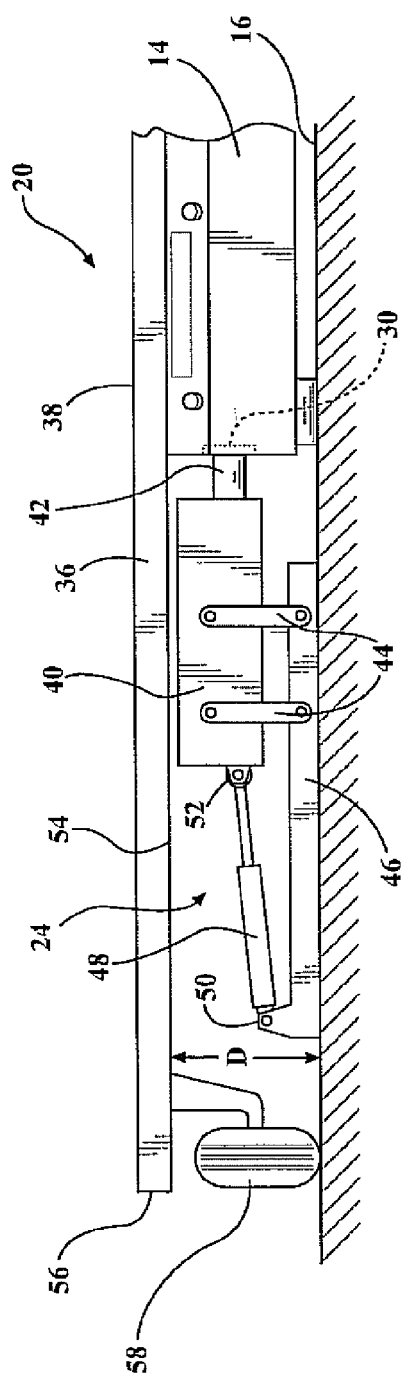

SYSTEM FOR CHARGING ELECTRICALLY POWERED AUTOMATED GUIDED VEHICLES

FIELD OF THE INVENTION

The present invention relates to a system for charging electrically powered automated guided vehicles and, more particularly, to a system in which the automated guided vehicle can be charged at a workstation even when carrying a load.

BACKGROUND OF THE INVENTION

Electrically powered automated guided vehicles are frequently used in factories, warehouses, and the like for transporting loads such as parts, components or materials from one location to another. In order to transfer the loads, the automated guided vehicle is engaged with a cart having a platform. A load or a plurality of the loads are often loaded onto the platform, and the automated guided vehicle transports the loads to various locations in the facility. In order to provide ample cargo space, the carts are dimensioned to be wide, and position the automated guided vehicle between the side edges of the cart. In addition, the carts are often utilized as moveable assembly lines and include areas for assembly team members to stand while working on the load (such as a component).

The automated guided vehicles transport the loads along a predetermined path from one work station to another. At each work station an operation is performed on the load. The operations on the load include the loading/unloading and transportation of the loads to predetermined points or work stations along the assembly line. Further, if the automated guided vehicle is being utilized as a moveable assembly line, the operations performed optionally include the progressive assembly of the load (such as a component). However, there are several safety concerns if the carts are high above the ground, including the danger of injury to assembly team members required to step on and off the cart, or the risk of injury due to the loading and unloading of the load at elevated levels. Accordingly, the carts and their platforms are disposed relatively low to the ground, and the automated guided vehicles are positioned to be at least partially underneath the cart.

Previously known facilities utilized opportunity electric chargers provided at at least one and more typically several locations in the facility to recharge the batteries in the automated guided vehicles as required. However, due to the positioning of the automated guided vehicle at least partially underneath and between the side edges of the cart, previously known chargers were unable to reach the automated guided vehicle. Accordingly, previous known procedures required that the automated guided vehicle be disengaged from the cart or the battery removed from the automated guided vehicle prior to the execution of the charging process. As such, the previous systems required that the automated guided vehicles be pulled out of operational duties in order to be recharged.

Thus, there exists a need for an improved system for charging electrically powered automated guided vehicles in which the opportunity charger is capable of operating within an envelope required due to the positioning of the automated guided vehicle at least partially underneath and between the side edges of the cart.

SUMMARY OF THE INVENTION

The present invention provides a system for periodically charging electrically powered automated guided vehicles which overcomes all of the above mentioned disadvantages of the previously known systems.

In brief, the present invention provides a charging station which is positioned along a predetermined route of an automated guided vehicle. The charging station is positioned at a work station in which the automated guided vehicle is halted. The charging station includes a charging arm which is selectively movable between a stowed position and a charge position in which the charging arm engages with the automated guided vehicle to perform a charging operation.

A processor is connected to the charging station to control the movement of the charging arm. A sensor is connected to the processor, and the sensor generates a first signal which indicates the presence of the automated guided vehicle at the work station. Upon sensing the presence of an automated guided vehicle, the sensor outputs the first signal to the processor and the processor controls the charging arm to move from the stowed position to the charge position to engage the automated guided vehicle and begin the charging operation.

In the charge position a pair of charging terminals physically contact and engage a pair of vehicle terminals located on one side of the automated guided vehicle. The contact between the charging terminals of the charging arm and the vehicle terminals of the automated guided vehicle initiates the charging operation. The charging operation continues during the time in which the automated guided vehicle is positioned at the work station.

Upon completion of the operation at the work station, a second signal is generated automatically or upon a user activated input device. The second signal is transmitted to the processor which controls the charging arm to move from the charging position in which the charging terminals are in physical contact and in engagement with the vehicle terminals to a stowed position in which the charging terminals are retracted away from the vehicle terminals. In the alternative, the processor optionally controls the movement of the charging arm from the charging position to the stowed position upon the expiration of a predetermined period of time during which the operation at the work station is conducted. Upon the disengagement of the charging arm from the automated guided vehicle, the automated guided vehicle proceeds along the predetermined route to the subsequent work station.

As each of the work stations along the predetermined route of the automated guided vehicle is provided with its own individual charging station, the automated guided vehicle is automatically charged while halted at the work station allowing the system to maintain a predetermined level of charge of the automated guided vehicles.

BRIEF DESCRIPTION OF THE DRAWINGS

A better understanding of the present invention will be had upon reference to the following detailed description when read in conjunction with the accompanying drawings, wherein like references refer to like parts throughout the several views, and in which:

FIG. 3 is a front view illustrating the automated guided vehicle at a work station having the charger arm in the stowed position; and FIG. 4 is a front view illustrating an automated guided vehicle positioned at the work station and with the charger aim in the charge position.

DETAILED DESCRIPTION OF A PREFERRED EMBODIMENT OF THE PRESENT INVENTION

The present invention provides a system for periodically charging an electrically powered automated guided vehicle which overcomes the previously known disadvantages. The system includes a plurality of work stations which at least partially define a predetermined route of an automated guided vehicle towing a cart. At each work station the automated guided vehicle is halted and an operation is performed on a load carried on the cart. A charging station is positioned at the work station and is located adjacent the predetermined route of an automated guided vehicle. The charging station includes a charging arm dimensioned to fit underneath the cart and between the side edge of the cart and the automated guided vehicle. The charging station is operable to perform a charging operation while underneath the cart while the automated guided vehicle is halted at the work station.

Figure 1:
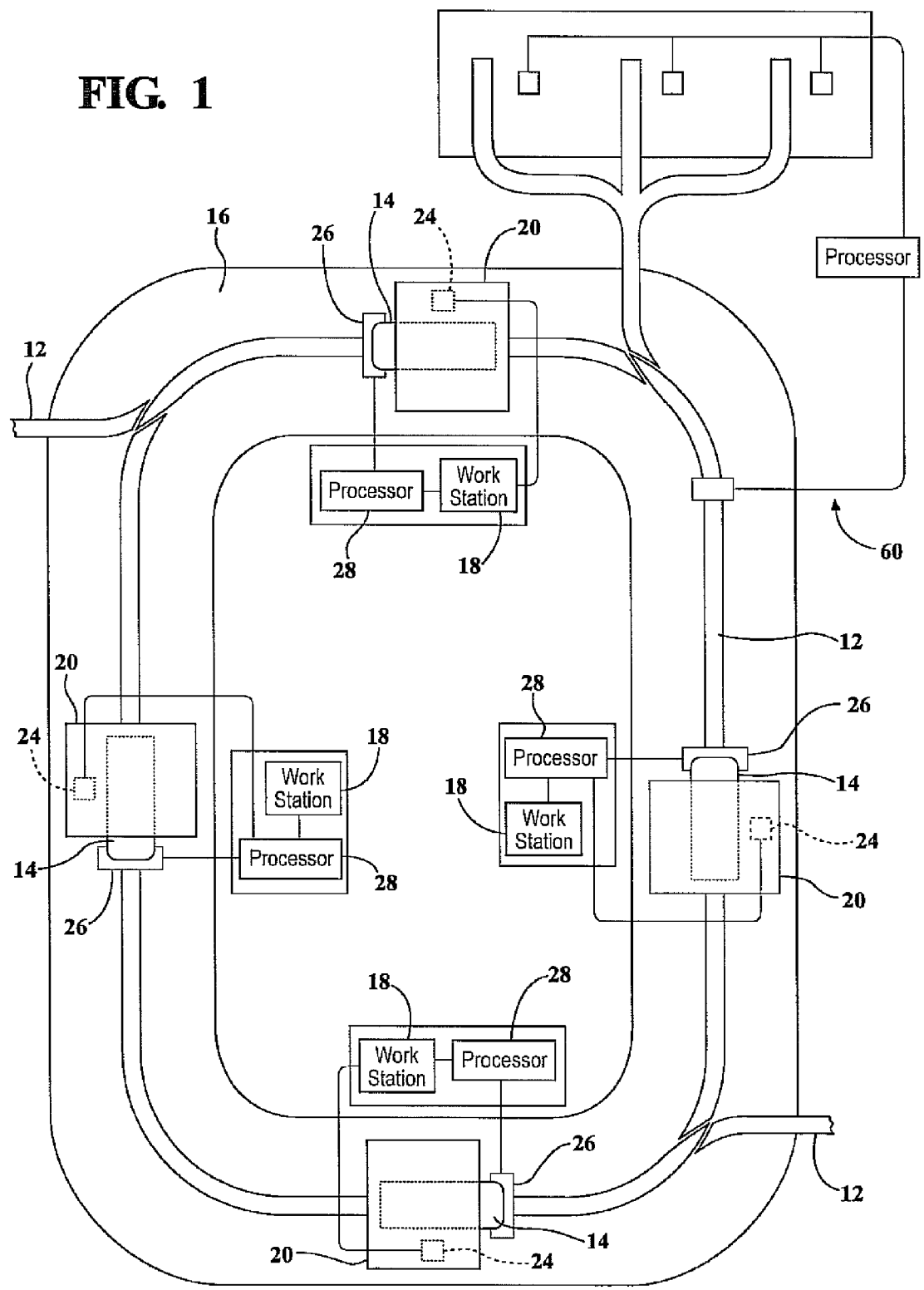
FIG. 1 is a top plane view diagrammatically illustrating a facility incorporating the inventive system.

With reference to FIG. 1, a facility employing the inventive system for periodically charging an electrically powered automated guided vehicle is generally illustrated at 10. The facility 10 is optionally a warehouse facility, a manufacturing facility, or the like which requires the transportation of various items from one location to another.

The system includes a plurality of pathways 12 which define a predetermined route for an automated guided vehicle 14. The pathways 12 are provided on the floor 16 of a facility 10, and are optionally painted lines, tracks, or paths defined by radio frequency emitting tags embed within the floor 16 of the facility 10. The pathways 12 define the path of travel of the automated guided vehicles 14 between a plurality of work stations 18. The automated guided vehicles 14 proceed along the pathways 12 of the predetermined route and halt at predetermined work stations 18. It is appreciated, of course, that several automated guided vehicles 14, travel the pathways 12 along the same predetermine route stopping at each work station 18, as illustrated in FIG. 1; however, the individual automated guided vehicles 14 optionally follow individual predetermined routes stopping only at predetermined work stations 18.

The automated guided vehicles 14 tow a cart 20 along the predetermined route between the work stations 18 following the pathways 12. As will be described in greater detail below, a load 22, such as a component, part, or material of an item of assembly, is carried by the cart 20. As the automated guided vehicle 14 progress along the pathways 12, the automated guided vehicle 14 and the towed cart 20 pauses at the work stations 18, and the load 22 undergoes an operation. The operation illustratively includes the assembly of additional components onto the load 22, the loading and unloading of loads 22 onto the cart 20, and the transfer of the load 22 between the work stations 18. It is appreciated, of course, that the operations described herein are for illustrative purposes only, and are non-limiting.

Although only four work stations 18 and automated guided vehicles 14 positioned along a circular path are illustrated in Figure, it is understood that a greater number of work stations 18 along with a greater number of automated guided vehicles 14 are present in the system. Furthermore, the predetermined route depicted by pathways 12 is not limited to a circular route and can include complex routes which include various offshoots and linear return paths.

At each work station 18 is a charging station 24 disposed adjacent the pathway 12. The charging station 24 is positioned adjacent the work station 18 so as to engage the automated guided vehicle 14 when the vehicle 14 is halted at each work station 18. A sensor 26 is connected to a programmed processor 28 to control the operation of the charging station 24 which will be described in greater detail below.

The sensor 26 is positioned along the predetermined route 12 such that the automated guided vehicle 14 periodically passes the sensor 26 when the automated guided vehicle 14 is halted at the work station 18. The sensor 26 generates and transmits a first signal to the program processor 28. The first signal is received by the processor 28 in order to indicate the presence of the automated guided vehicle 14 at the charging station 24. Upon receipt of the first signal, the processor controls the charging station 24 to begin the charging operation. It is understood that the sensor 26 is optionally used in conjunction with a work station 18 in order to initiate the performance of the work station operation. The sensor 26 is optionally a trigger switch activated by the automated guided vehicle 14 and/or the cart 20, a metal detector embedded within the floor 16 of the facility 10, a wireless receiver which receives a signal generated by a transmitter on the automated guided vehicle 14 and/or the cart, or any other type known to those of ordinary skill in the art.

Figure 2:
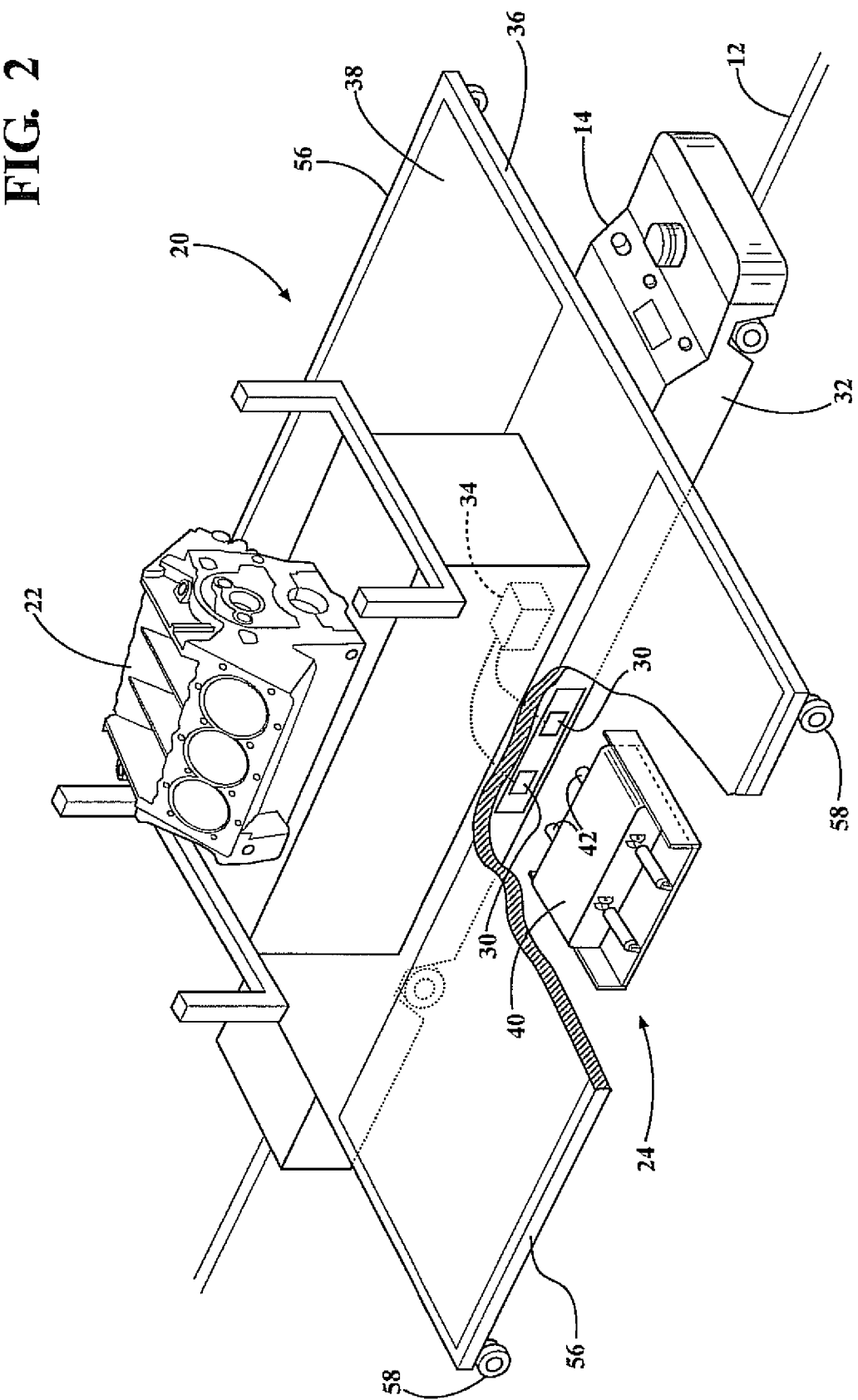
FIG. 2 is a perspective view illustrating an automated guided vehicle.

With reference to FIG. 2, it can be seen that the automated guided vehicle 14 tows the cart 20 upon which the load 22 is provided. As described above, when the automated guided vehicle 14 is halted at each work station, the load 22 disposed on the cart 20 undergoes various work station operations. During the time required to execute the work station operation, the charging station 24 is used as an opportunity charger to provide a charge to the electrically powered automated guided vehicle 14 while stationary.

Each of the automated guided vehicles 14 includes a pair of vehicle terminals 30 positioned along one side 32 of the vehicle 14. The vehicle terminals 30 are electronically connected to a storage device such as a battery 34 which supplies power to the electronic motor and the electronic equipment of the automated guided vehicle 14. As seen in FIG. 2, the automated guided vehicle 14 is positioned beneath the cart 20 and is significantly narrower than the cart 20.

The cart 20 includes a platform 36 upon which the load 22 is provided. In the illustrated embodiment, the load 22 is an engine of an automotive vehicle. The load 22 is provided on an upper work surface 38 of the platform and includes additional work space provided on either side of the load 22 in order to accommodate assembly team members an area to stand and work on the load 22.

The charging station 24 includes a charging arm 40 having a pair of charging terminals 42 disposed at a distal end thereof. The charging arm 40 is pivotally attached by a pair of brackets 44 to a base 46 secured to the floor 16. An actuator 48 (or a plurality of actuators) such as a pneumatic cylinder, an air cylinder, a hydraulic cylinder, or an electronically controlled solenoid has one end 50 pivotally connected to the base 46 and an opposite end 52 pivotally connected to the charging arm 40. The actuator 48 is controlled by the processor 28 to selectively move the charging arm 40 from a stowed position as best seen in FIG. 3 to a charging position as seen in FIG. 4.

In the stowed position, the charging terminals 42 are retracted away from the vehicle terminals 30 of the automated guided vehicle 14. In the charge position, the charging arm 40 is actuated by the actuator 48 such that the charging terminals 42 are in physical contact and engagement with the vehicle terminals 30 in order to electronically charge the automated guided vehicle 14 and/or the battery 34.

As best seen in FIGS. 3 and 4, the platform 36 of the cart 20 includes a bottom surface 54 opposite the upper work surface 38. The bottom surface 54 faces the floor 16 of the facility 10. The distance D between the bottom surface 54 and the floor 16 defines the vertical operational envelope of the charging station 24. The distance D is typically about 15 centimeters in length and as such provides a low profile for the cart 20 ensuring compliance with safety regulations such that assembly team members can easily step on and off of the work surface 38 while avoiding injury. The total height of the charging station 24 is dimensioned to be less than the vertical operational envelop that is distance D defined as the distance between the bottom surface 54 of the platform 36.

The horizontal operational envelope of the charging station 24 is defined by the distance between a side edge 56 of the platform 36 and the side 32 of the automated guided vehicle 14. A plurality of wheels 58 are provided along the side edges 56 of the platform 36 allowing the cart 20 to be easily towed by the automated guided vehicle 14. The wheels 58 prohibit the placement of a fixed charging station extending from beyond the side edge 56 of the platform 36 to the vehicle terminals 32 without the automated guided vehicle 14 and the towed cart 20 carrying the load 22 going over the fixed charge. However, due to the low profile of the automated guided vehicle 14 and the cart 20, and the excessive weight of the load 22 it is undesirable to have the automated guided vehicle 14 and the cart 20 ascend over a fixed charger.

Rather, the charging station 24 is positioned to be adjacent the pathway 12 at the work stations 18, such that the cart 20 passes over the charging station 24 as best seen in FIG. 1. The charging station 24 is placed such that upon approach of the automated guided vehicle 14 and the cart 20, the charging station 24 is positioned between the side edge 56, specifically the inner side of the wheel 58 and the side 32 of the automated guided vehicle 14 having the vehicle terminals 30. As the automated guided vehicle 14 halts at the work station 18, the charging station 24 is positioned beneath the bottom surface 54 of the platform 36 and between the side edge 56 and the automated guided vehicle 14, specifically, the charging station 24 is positioned between the inner side of wheel 58 and the side 32 of the automated guided vehicle 14 having the vehicle terminals 30.

The charging station 24 is designed to switch between a stowed position (in which the charging terminals 42 are retracted away from the vehicle terminals 30) and a charging position (in which the charging terminals 42 physically contact the vehicle terminals 30 to charge automated guided vehicle 14) within the small vertical operational envelope of distance D between the floor 16 and the bottom surface 54 of the platform 36. The low profile configuration of the charging station 24 allows the automated guided vehicle 14 to be charged even when towing the cart 20. The configuration of the charging station 24 with the pair of brackets 44 being pivotally connection to the base 46 allows for the linear movement due to the actuation of the actuator 48 of the charging arm 40 with limited movement in the vertical direction so as to be operable within the envelope defined as distance D.

In order to facilitate a better understanding of the principles associated with the inventive charging system, its method of operation will now be described. The automated guided vehicle 14 tows cart 20 having load 22 disposed upon the platform 36 from one work station 18 to another work station along the pathway 12 of the facility 10. The automated guided vehicle 14 follows the predetermined route of the pathway 12 until the automated guided vehicle 14 halts at a work station 18. The charging station 24 is positioned adjacent the pathway 12 so as to be between the side edge 56 of the platform and the automated guided vehicle 14. As the charging station 24 is dimensioned to have a total vertical height less than the distance D, the cart 20 passes over the charging station 24 such that the charging station 24 is positioned beneath the bottom surface 54 of the platform 36.

Upon the automated guided vehicle's 14 stopping at the work station 18 with the charging station 24 positioned beneath the bottom surface 54 of the platform 36 and between the side edge 56 and the automated guided vehicle 14, the sensor 26 senses the presence of the automated guided vehicle 14 and outputs a first signal to the processor 28 indicating the presence of the automated guided vehicle 14. The processor 28 upon receipt of the first signal controls the actuator 48 to actuate and move pivot the charging arm 40 about the pair of brackets 44 from the stowed position as seen in FIG. 3 to the charge position as seen in FIG. 4. In the charging position, the charging terminals 42 disposed at a terminal end of the charging arm 40 physically contact and engage the vehicle terminals 30 of the automated guided vehicle 14 in order to charge the battery 34. In the charging position, the charging station 24 is within the vertical operational envelope of distance D between the bottom surface 54 of the platform 36 and the floor 16.

The processor 28 executes the charging operation until the expiration of a predetermined time upon which the processor 28 controls the actuator 48 of the charging station 24 to disengage the charging terminals 42 from the vehicle terminals 30 and move the charging arm 40 from the charge position to the stowed position. In the alternative, the processor 28 continues the charging operation until the processor 28 receives a second signal generated by an input device connected to the processor 28. The input device can be a user actuated input device located on either the work station 18 or the cart 20, upon which an assembly team member will actuate the input device signaling the completion of the work station operation. In a second alternative, the input device automatically generates the second signal upon completion of the work station operation.

Upon the disengagement of the charging arm 40 and its movement from the charge position to the stowed position, the automated guided vehicle 14 advances along the pathway 12 to the subsequent work station 18 in which the charging operation will be repeated. The periodic charging of the automated guided vehicle 14 at each of the work station 18, allows for the battery 34 of the automated guided vehicle 14 to maintain a predetermined charge level. Specifically, the charging of the automated guided vehicle 14 at each work station 18 maintains a charge level of about 70-80% charge during the entire operational period of the automated guided vehicle 14. As seen in FIG. 1, a deep charge station 60 as described in co-pending U.S. patent application Ser. No. 13/036,235 filed Feb. 28, 2011, which is herein incorporated by reference in the entirety, is provided for a regenerative deep charging of the battery 34.

From the foregoing, it can be seen that the present invention provides a simple and highly effective system for periodically charging electrically powered automated guided vehicles by disposing the charging station so as to be positioned between an outer edge of a towed cart and the automated guided vehicle and providing the charging station to operate within the envelope defined by the distance between the bottom surface of the cart and the floor of the facility. Having described the invention, however, many modifications thereto will become apparent to those skilled in the art to which it pertains without any deviation from the spirit of the invention as defined by the scope of the appended claims.

It is claimed:

1. A system for charging an electrically powered automated guided vehicle that transports a load in a facility, said system comprising:

an automated guided vehicle following a predetermined route along a floor of the facility, the automated guided vehicle having a pair of vehicle terminals positioned on one side of said automated guided vehicle;

a platform for supporting the load, said platform positioned above automated guided vehicle; and a charging station positioned adjacent said predetermined route, said charging station having a charging arm selectively moveable between a stowed position and a charge position to charge said automated guided vehicle;

said charging arm having charging terminals, said charging arm positioned beneath said platform when said automated guided vehicle is at said charging station, said charging arm moves from said stowed position to said charge position such that said charging terminals engage said vehicle terminals.

2. The system of claim 1, wherein said platform includes a work surface for supporting the load, an opposite bottom surface facing the floor, and a pair of side edges, said automated guided vehicle connected to said platform at said bottom surface and between said pair of side edges of said platform.

3. The system of claim 2, wherein said automated guided vehicle stops at said charging station along said predetermined route such that said charging station is positioned underneath said bottom surface of said platform and between one of said pair of side edges and said automated vehicle, and wherein said charging arm moves from said stowed position to said charge position underneath said bottom surface of said platform to engage said charging terminals with said vehicle terminals to charge said automated guided vehicle.

4. The system of claim 3, wherein a height of said charging arm in said charge position is less than a distance between said bottom surface of said platform and the floor.

5. The system of claim 4, wherein the distance between said bottom surface of said platform and the floor is generally 15 centimeters.

6. The system of claim 1, wherein said charging station includes a base, an actuator, and a pair of brackets, wherein said pair of brackets pivotally attaches said charging arm to said base, said actuator selectively moves said charging arm between said stowed position and said charge position.

7. The system of claim 1, wherein said system further includes a processor connected to said charging station to control the movement of said charging arm; and a sensor connected to said processor, said sensor generates a first signal which indicates the presence of the automated guided vehicle at said charging station;

wherein said processor actuates the charging arm from said stowed position to said charge position to charge the automated guided vehicle upon receipt of said first signal.

wherein said processor is programmed to actuate the charging arm from said charge position to said stowed position at the end of a predetermined time period.

8. The system of claim 7, wherein said charging station is positioned at a work station disposed along the predetermined route, said automated guided vehicle stopping at said work station in order to undergo an operation on the load, and wherein said charging station is positioned underneath said bottom surface of said platform and between one of said pair of side edges and said automated guided vehicle when said automated guided vehicle is stopped at said work station.

9. The system of claim 8, wherein said processor is connected to said work station, and wherein said processor is programmed to actuate the charging arm from said charge position upon receipt of a second signal from said work station indicating the completion of the operation on the load.

10. The system of claim 9, wherein said second signal is generated by an input device, said input device being actuated by a user upon completion of said operation.

11. The system of claim 9, wherein said second signal is generated by said work station upon expiration of a predetermined time period.

12. The system of claim 1, wherein said charging station performs a maintenance charge of the automated guided vehicle to maintain a predetermined level of charge on the automated guided vehicle.

13. The system of claim 1, wherein said platform includes at least one wheel positioned adjacent to each of said pair of sides, and wherein said charging station is positioned between an inner side of one of said wheels and said automated guided vehicle when said automated guided vehicle is stopped at said charging station.

14. The system of claim 9, wherein said automated guided vehicle stops at a plurality of work stations along said predetermined route, each work station having a charging station to charge said automated guided vehicle while stopped at said work station.

* * * * *